(12) United States Patent
Kellner et al.

(10) Patent No.: US 12,021,254 B2
(45) Date of Patent: Jun. 25, 2024

(54) MULTI-CHAMBER BATTERY MODULE

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 25 days.

(21) Appl. No.: 18/078,185

(22) Filed: Dec. 9, 2022

(65) Prior Publication Data
US 2023/0187761 A1   Jun. 15, 2023

(30) Foreign Application Priority Data

Dec. 10, 2021   (DE) ...................... 10 2021 132 597.8

(51) Int. Cl.
| | |
|---|---|
| *H01M 50/289* | (2021.01) |
| *B60K 1/04* | (2019.01) |
| *B60L 50/64* | (2019.01) |
| *H01M 50/209* | (2021.01) |
| *H01M 50/249* | (2021.01) |
| *H01M 50/51* | (2021.01) |

(52) U.S. Cl.
CPC ............ *H01M 50/289* (2021.01); *B60K 1/04* (2013.01); *B60L 50/64* (2019.02); *H01M 50/209* (2021.01); *H01M 50/249* (2021.01); *H01M 50/51* (2021.01); *B60K 2001/0405* (2013.01)

(58) Field of Classification Search
CPC ............. H01M 50/289; H01M 50/249; H01M 50/209; H01M 50/51; B60L 50/64; B60K 1/04; B60K 2001/0405
See application file for complete search history.

(56) References Cited

U.S. PATENT DOCUMENTS

| | | | |
|---|---|---|---|
| 2004/0050595 A1 | 3/2004 | Saito et al. | |
| 2021/0111386 A1* | 4/2021 | Kellner | ................. B60L 50/64 |
| 2022/0336886 A1* | 10/2022 | Kellner | ............ H01M 10/6553 |

FOREIGN PATENT DOCUMENTS

| | | | | | |
|---|---|---|---|---|---|
| CN | 109075269 A | * | 12/2018 | ........ | H01M 10/0413 |
| DE | 102018205962 A1 | * | 10/2019 | ............... | B60K 1/04 |

* cited by examiner

*Primary Examiner* — Jared Fureman
*Assistant Examiner* — Duc M Pham
(74) *Attorney, Agent, or Firm* — Buchanan Ingersoll & Rooney PC

(57) ABSTRACT

A multi-chamber battery module is equipped with first cell packets and second cell packets. The multi-chamber battery module includes a module housing divided into at least three adjacently arranged regions in a first direction by first separating walls. At least two first or second cell packets are arranged in each region in a second direction arranged perpendicular to the first direction. The regions arranged externally in the first direction include the first cell packets and the at least one region lying between the externally arranged regions includes the second cell packets. The first cell packets include electrical connections, which are arranged on opposite sides of the cell packets. The second cell packets include electrical connections, which are arranged on the same side of the cell packets. Cell packets that are arranged side-by-side across regions are electrically connected to one another in series.

10 Claims, 2 Drawing Sheets

MULTI-CHAMBER BATTERY MODULE

CROSS-REFERENCE TO RELATED APPLICATION

This application claims priority to German Patent Application No. 10 2021 132 597.8, filed Dec. 10, 2021, the content of such application being incorporated by reference herein in its entirety.

FIELD OF THE INVENTION

The present invention relates to a multi-chamber battery module, in particular for use in a traction battery of an electric vehicle.

BACKGROUND OF THE INVENTION

According to the prior art, high-voltage batteries (HV batteries) for driving a vehicle typically comprise a metallic battery housing in which a plurality of battery modules are arranged. The battery housing serves on the one hand to secure the battery in the vehicle and to provide protection in the event of an accident, and, on the other hand, it provides media-tightness and EMC shielding. Each of the modules arranged in the battery itself comprises a battery module housing made of metal and/or plastic, in which a number of battery cells are arranged and tensioned.

In addition, there are novel battery concepts that allow, for example, battery modules to be mounted directly on the vehicle body. Provided that the battery modules have sufficient stability, weight and design space can thus be saved by the elimination of the battery housing. Further, the position of the individual battery modules relative to one another can be adjusted within certain limits, in particular with respect to an optimization of driving dynamic properties of the vehicle.

In the case of electric vehicles available on the market today, which have considerable power output, a good waste heat management plays an equally important role in the traction batteries used, in addition to their structural properties. One of the most well-known risks for traction batteries is the thermal runaway of a cell. The reason for this is usually an excess of the permissible operating parameters, i.e. too high a charging or discharging current and thus too high a cell voltage. These effects can cause an excess of the allowable operating temperature of the battery cell in question and can cause very rapid and uncontrolled heating of the battery cell. In the case of such an incident, it is important to prevent a correspondingly impending thermal propagation, i.e. the spread of a thermal event from the originally affected battery cell to adjacent battery cells. If this fails, the heat of the runaway battery cell can "infect" adjacent cells, so that within a short time, sometimes within seconds, the temperature of the entire battery module rises vigorously. Such a cascade can at worst cause the whole battery module to ignite and sometimes even explode.

SUMMARY OF THE INVENTION

In light of the foregoing, the problem underlying the present invention can be seen in the provision of a battery construction that provides advantages in the interconnection of cell packets (cell stacks) and a spatial separation of cell packets, whereby a thermal propagation can be contained in the case of a thermal event.

This problem is solved with the apparatus according to the independent claim. Further preferred embodiments can be found in the dependent claims.

According to the present invention, there is provided a multi-chamber battery module equipped with first cell packets and second cell packets, each comprising an arrangement of battery cells. For example, the battery cells can be prismatic cells. The multi-chamber battery module comprises a module housing, which is divided into at least three adjacently arranged regions in a first direction by means of first separating walls, wherein at least two first or second cell packets are arranged in each region in a second direction arranged perpendicular to the first direction. By providing at least two first separating walls within the module housing, which are vertically arranged therein, the internal space is divided into at least three main chambers. The first separating walls thus function as spacers for the cell packets and as fire protection walls, wherein they are made of a material suitable for this purpose.

In a subsequently used rectangular coordinate system, the first direction corresponds to a direction along the x-axis and the second direction corresponds to a direction along the y-axis. Accordingly, the third direction corresponds to a direction along the z-axis.

In order to enable an advantageous electrical circuitry of the interior of the multi-chamber battery module according to the invention, the regions arranged externally in the first direction comprise first cell packets and the at least one region lying between the externally arranged regions comprises the second cell packets. While the first and second cell packets both comprise an arrangement of battery cells, they differ in the number of battery cells arranged therein, which results in a different placement of the module connections in both, without the need to lay unnecessarily long power buses. Specifically, the first cell packets comprise electrical connections that are arranged on the same side of the cell packets. These can be sides of the cell packets corresponding to end faces of the cell packets and arranged along the second direction. The second cell packets, on the other hand, comprise electrical connections arranged on opposite sides of the cell packets. Further, those cell packets arranged side-by-side across regions are electrically connected to one another in series. The electrical circuitry of the cell packets can be carried out through the first separating walls.

Due to the special selection and arrangement of the cell packets, very short direct power connections can be used within the multi-chamber battery module in order to interconnect those cell packets that are wired in a row. In particular, the power connections of the cell packet string forming a series circuit (hereinafter briefly referred to as "cell packet string") comprising cross-region cell packets (i.e. first as well as second cell packets) can be present in the second direction on outer sides of the battery module housing. The first cell packets, which, when viewed in the first direction, are arranged in external regions, are used in order to shift the electrical connections on the edge side within a cell packet string to the center of the battery module housing.

The multi-chamber battery module according to aspects of the invention enables an efficient connection of the cell packets within the module, which in particular requires no long power buses, which are associated with increased losses, increased design space, and additional expenses for a suitable conductive material—usually copper. The shorter power buses in particular not only result in cost advantages but also weight advantages, and the battery cells within the entire battery module can be packed more tightly. The spatial separation of the cell packets by means of the first separating walls results in safety advantages with respect to thermal propagation. This is especially clearly the case in those embodiments of the invention (which will be explained in more detail below) when each region is additionally divided into two subregions by means of a wall extending in the first direction, between which there is no electrical connection.

In further embodiments of the multi-chamber battery module according to the invention, the first separating walls can extend along the second direction substantially continuously, i.e. without a substantial interruption, from one end to the other end of the module housing. The ends of the module housing can each be closed with a lid.

In further embodiments of the multi-chamber battery module according to the invention, each region can be divided in the second direction into at least two subregions in each case by means of a second separating wall. The second separating walls can substantially correspond to the first separating walls and can also be configured as firewalls. Each subregion then forms a chamber that provides fire protection for the cell packet arranged therein. By means of the second separating walls, a media-tight separation of the battery module housing in the first direction in at least two media-tightly separated parts can be carried out.

In further embodiments of the multi-chamber battery module according to the invention, at least one module connection for electrically contacting the multi-chamber battery module can be arranged between the cell packets arranged in an externally arranged region. In addition, the cell packets arranged in a region can be arranged in a second direction at a distance from one another and, as noted in the previous paragraph, can be media-tightly separated from one another by means of a second separating wall. Consequently, the cell packets within the module housing can be interconnected with two separate serial circuits. In a preferred embodiment, two electrical and externally guided connection regions for the module connections can be provided, which are arranged in the first direction at a distance from one another and can lie at about the same height in the second direction.

In further embodiments of the multi-chamber battery module according to the present invention, the first and second cell packets can have a different number of cells arranged in rows adjacent to one another in the interior. Within the cell packets, the battery cells can all be wired in series in a serpentine line. In this case, the number of rows or battery cells, when only one battery cell is arranged per row, it can be controlled whether the first pole connection of the first battery cell in the series circuit and the opposite pole connection of the last battery cell in the series circuit are fed out to the same side or to opposite sides of the battery module.

In further embodiments of the multi-chamber battery module according to the present invention, in view of the previous paragraph, the first cell packets can have an odd number of rows, and the second cell packets can have an even number of rows. Thus, while saving material for additional and/or unnecessary power connections, it can be controlled whether the electrical connections of a cell packet are arranged on the same side or on opposite sides (e.g. the two end faces) of the respective cell packet.

In further embodiments of the multi-chamber battery module according to the invention, the latter can further comprise at least one fastening means receptacle for receiving a fastening means for directly fastening the multi-chamber battery module to a vehicle body, being arranged in a region between two cell packages. For example, the fastening means receptacle can be arranged along the first direction in one of the not externally arranged regions and can correspond to a hollow cylinder with or without internal threads. By means of the at least one fastening means receptacle, the multi-chamber battery module according to aspects of the invention can be screwed directly onto a body of a vehicle, without an additional battery box.

In further embodiments of the multi-chamber battery module according to the present invention, the module housing can comprise at least one extrusion profile whose extrusion direction corresponds to the second direction. As already mentioned, the ends of the at least one extrusion profile can be closed with lids so that the module housing can be designed so as to be generally media-tight. If necessary, by removing the lids closing the ends of the module housing, the cell packets, and in particular their electrical connections, can be serviced.

In further embodiments of the invention, there is provided an electric vehicle with a traction battery, wherein the traction battery comprises at least one previously described multi-chamber battery module. The electric vehicle can preferably comprise three multi-chamber battery modules of the type previously described.

In further embodiments of the electric vehicle according to the invention, the at least one multi-chamber battery module in the vehicle can be installed in the vehicle transverse direction between the left and right rocker panel.

It goes without saying that the features mentioned above and those yet to be discussed below can be used not only in the respectively specified combination, but also in other combinations or on their own, without leaving the scope of the present invention.

BRIEF DESCRIPTION OF THE DRAWINGS

Further advantages and configurations of the invention will emerge from the entirety of the description and the accompanying drawing.

DETAILED DESCRIPTION OF THE INVENTION

Figure 1:
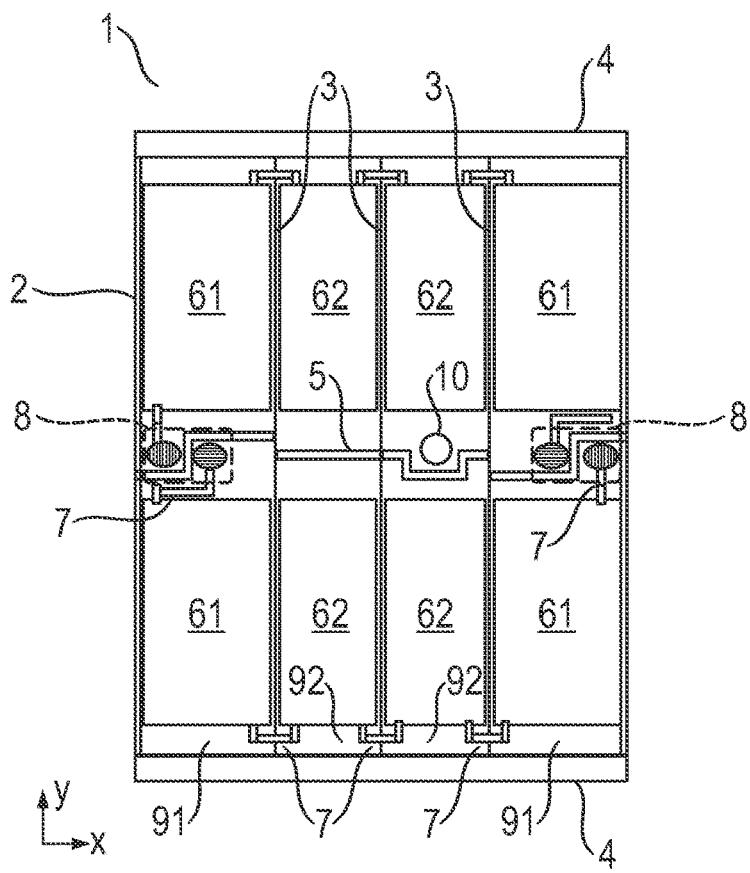
FIG. 1 shows a schematic view of a multi-chamber battery module according to aspects of the invention in a sectional view from above.

In FIG. 1, an exemplary embodiment of a multi-chamber battery module 1 according to aspects of the invention is shown in a sectional view from above. The multi-chamber battery module 1 comprises a module housing 2 containing a plurality of cell packets, namely first cell packets 61 and second cell packets 62. Each of the two ends of the module housing 2 is closed with a lid 4.

Vertical first separating walls 3 are provided within the module housing 2 in a first direction (x-direction), which, in the example shown, divide the interior space of the multi-chamber battery module 1 into four distinct regions 91, 92, wherein at least two first or second cell packets 61, 62 are arranged in each region 91, 92 along a second direction (y-direction) that is arranged perpendicular to the first direction. The first separating walls 3 run along the second direction substantially without interruption from one end to the other end of the module housing 2, i.e. extend substantially between the two closing lids 4.

The arrangement of the cell packets 61, 62 is deliberately selected such that the electrical connections 7 between the cell packets 61, 62 can be as short as possible. To this end, two first cell packets 61 are arranged in each of the regions 91 arranged externally in the first direction, and two second cell packets 62 are arranged in each of the central and intermediate regions 92. As can be well seen, the first cell packets 61 have electrical connections 7 arranged on opposite sides of the first cell packets 61 relative to the second direction, whereas the second cell packets 62 have electrical connections 7 arranged on the same side of the cell packets 62 relative to the second direction. Thus, the first cell packets 61 extend the electrical connection to the respective module connections 8, so to speak, outwardly from the center of the multi-chamber battery module 1, and the interconnection of the second cell packets 62 located at the same level to a cell packet string (i.e. in FIG. 1, the lower four cell packets and the upper four cell packets) occurs via the respective same sides of the cell packets 61, 62, so that very short connections 7, or substantially maximally short within the scope of the possibility, can be used. Further, it can be seen that the electrical connections 7 between the cell packets 61, 62 of a cell packet string lie snugly against the lids 4 and face the ends of the module housing 2, which allows and/or facilitates any necessary inspection or repair of the battery modules 61, 62 arranged inside the multi-chamber battery module 1. Each module connection 8 comprises two contacts, so that the voltage on the lower cell packet string and the upper cell packet string can be tapped separately from one another.

In addition to the first walls 3 that divide the interior of the module housing 2 into the regions 91, 92, in each of these regions 91, 92 there is a second separating wall 5 extending in the first direction, which divides each region 91, 92 into at least two subregions. The separating walls 5 of each region 91, 92 can also correspond to a single separating wall extending transversely through the regions 91, 92. The separating wall 5 fulfills the role of a firewall, on the one hand. Because a transverse connection between the lower and upper cell packet string is not required, the module housing 2 can be divided into two media-tightly separated compartments by the separating walls 5 (or even by one common separating wall 5), wherein a cell packet string is arranged in each compartment. The clearance between the aforementioned cell stacks 61, 62 in a region 91, 92 can be used in order provide the module connections 8. Furthermore, in one of these clearances, a fastening means receptacle 10 for receiving a fastening means for directly fastening the multi-chamber battery module 1 according to aspects of the invention in or on a vehicle body can be provided in a rather centrally arranged region. The receptacle 10 may be a hole, opening or mounting surface, for example.

Figure 2:
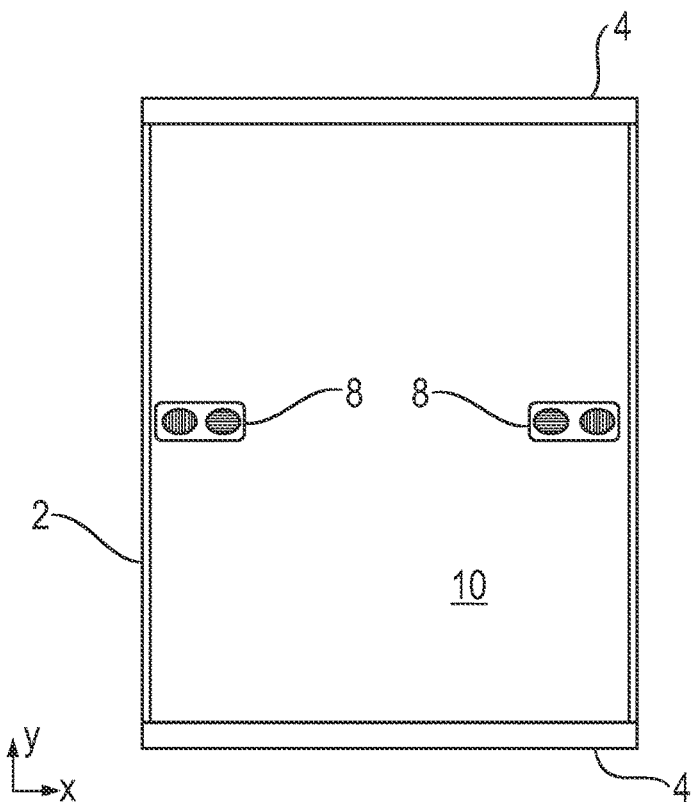
FIG. 2 shows a schematic view of the multi-chamber battery module according to aspects of the invention from FIG. 1 in a sectional view from above with the housing cover.

In FIG. 2, a schematic view of the multi-chamber battery module 1 according to aspects of the invention from FIG. 1 is shown in the same view. By contrast to the view in FIG. 1, however, in FIG. 2 the module housing 2 is closed with a housing cover 10, which has been disassembled in FIG. 1. As shown, only the module connections 8 are arranged on the outside of the multi-chamber battery module 1, being at the same height here with respect to the second direction.

Figure 3:
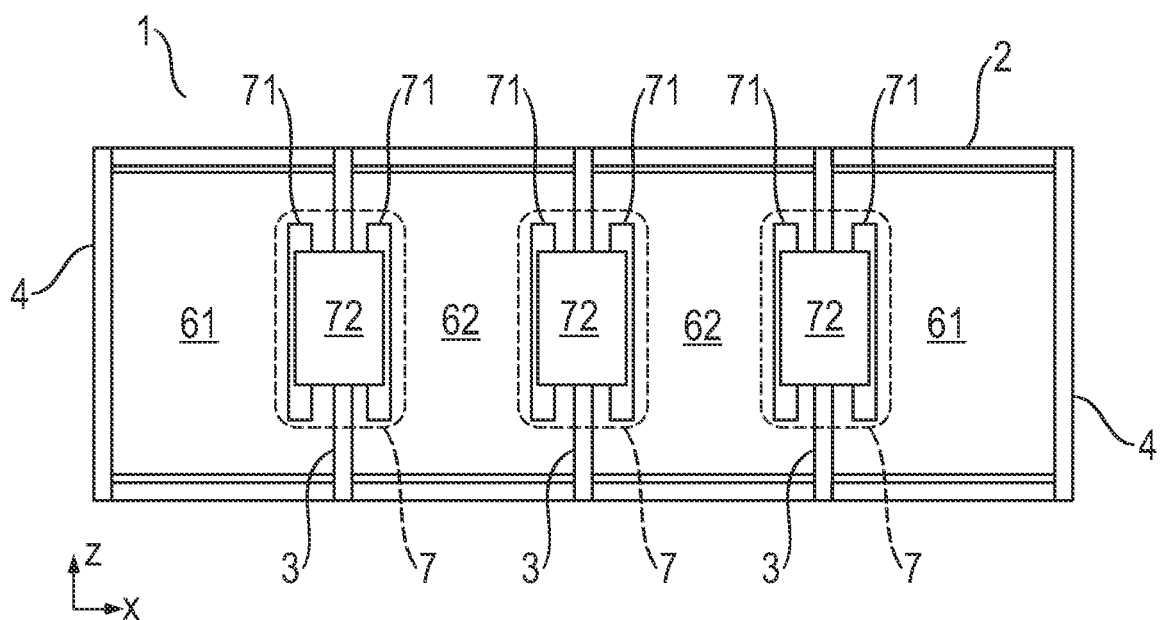
FIG. 3 shows a schematic view of the multi-chamber battery module from FIG. 1 according to aspects of the invention in a sectional view from the side with a disassembled lid (view along the second direction).

FIG. 3 shows a schematic view of the multi-chamber battery module 1 according to aspects of the invention from FIG. 1 in a cross-sectional view from the side with the disassembled lid 4 (view along the second direction). In the figure, the electrical connection between the cell stacks 61, 62 is shown in somewhat greater detail. Accordingly, each cell stack 61, 62 includes two cell contacts 71, wherein only the cell contacts 71 of the second cell stack 62 are arranged on the same side of the cell stack 62. In the case of the first cell stack 61, the respective other cell contact 71 is arranged on the opposite side of the first cell stack 61.

The four cell stacks 61, 62 shown are directly electrically connected in series in pairs by means of power buses 72, thus forming a cell stack string.

Figure 4:
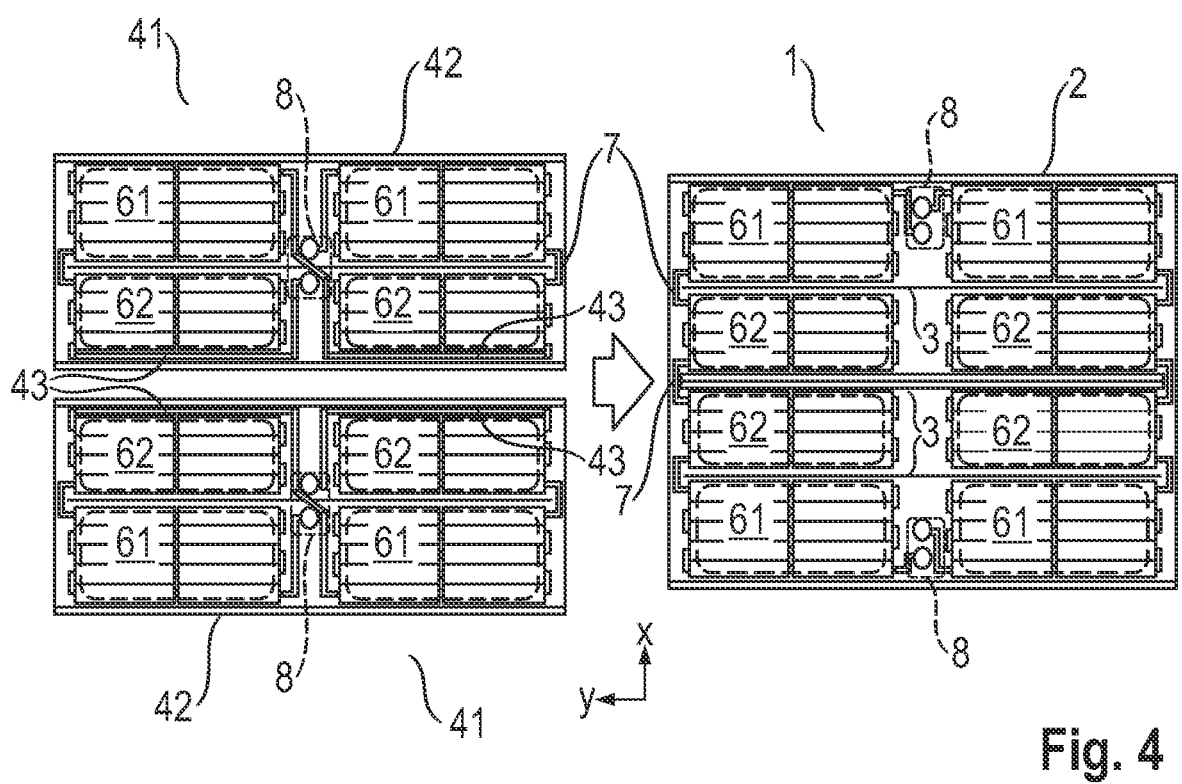
FIG. 4 illustrates the approach underlying the invention.

In FIG. 4, a special circuitry topology of the approach underlying the invention is illustrated. Two battery modules 41 are shown on the left-hand side. Each of the battery modules 41 has a housing 42 in which two first cell stacks 61 and two second cell stacks 62 are arranged. Here, each first cell stack 61 has five rows of battery cells, wherein two battery cells are arranged in each row. The second cell stack 62 has one row less.

When using prismatic cells in a 216s circuit, it can be seen that additional power buses 43 are required in order to obtain this desired topology. More specifically, in each of the two battery modules 41, two power buses 43 are required, each extending over the entire length of a cell stack 61, 62 and thus having a relatively large dimension.

By means of the present invention, this problem can be solved elegantly, among other things. On the right-hand side of FIG. 4, the multi-chamber battery module 1 of FIG. 1 is shown, wherein its orientation has been rotated by 90° merely for the purpose of improved illustration. It can be seen that, due to an altered arrangement of the cell stacks 61, 62 from the structure shown on the left-hand side of FIG. 4, the same circuit diagram can be achieved, but the two additional power buses 43 are omitted, which were still required for the battery modules 41 shown on the left-hand side. In addition, there is a better differentiation of the cell stacks 61, 62 against one another, because, in the case of the multi-chamber battery module 1 according to the invention, as opposed to the structure known from the prior art (FIG. 4, left), in particular no electrical passage through the first separating walls 3 is required, which represents a potential point of risk for leakage and thus prevents absolute and permanent media-tight separation of the respective cell stacks 61, 62.

What is claimed is:

1. A multi-chamber battery module comprising:
   first cell packets each comprising electrical connections that are arranged on opposite sides of the respective first cell packet,
   second cell packets each comprising electrical connections that are arranged on a same side of the respective second cell packet, and
   a module housing divided into at least three adjacently arranged regions in a first direction by way of first separating walls,
   wherein at least two first or second cell packets are arranged in each region along a second direction that is oriented perpendicular to the first direction,
   wherein the first cell packets are arranged in outermost regions of said three adjacently arranged regions,
   wherein the second cell packets are arranged in at least one interior region of said three adjacently arranged regions lying between the outermost regions of said three adjacently arranged regions, and wherein the first and second cell packets that are arranged side-by-side across regions are electrically connected to one another in series.

2. The multi-chamber battery module according to claim 1, wherein the first separating walls extend along the second direction substantially continuously from one end to the other end of the module housing.

3. The multi-chamber battery module according to claim 1, wherein each region is divided into at least two subregions in the second direction by a second separating wall.

4. The multi-chamber battery module according to claim 1, wherein at least one module connection for electrically contacting the multi-chamber battery module is arranged between the first cell packets.

5. The multi-chamber battery module according to claim 1, wherein the first and second cell packets have a different number of cells arranged side-by-side in rows.

6. The multi-chamber battery module according to claim 5, wherein the first cell packets have an odd number of rows and the second cell packets have an even number of rows.

7. The multi-chamber battery module according to claim 1, further comprising at least one fastening means receptacle for receiving a fastening means for directly fastening the multi-chamber battery module to a vehicle body, wherein the at least one fastening means receptacle is arranged between two cell packets.

8. The multi-chamber battery module according to claim 1, wherein the module housing comprises at least one extrusion profile having an extrusion direction that corresponds to the second direction.

9. An electric vehicle having a traction battery, wherein the traction battery comprises at least one multi-chamber battery module according to claim 1.

10. The electric vehicle according to claim 9, wherein the at least one multi-chamber battery module is installed in the vehicle in a vehicle transverse direction and between left and right rocker panels of the vehicle.

* * * * *